June 10, 1969 B. E. ATTWOOD 3,449,679
AUDIO AMPLIFIER CIRCUITS AND THE LIKE
Filed March 15, 1966

INVENTOR.
BRIAN E. ATTWOOD
BY
Frank R. [signature]
AGENT

INVENTOR.
BRIAN E. ATTWOOD
BY
Frank R. [signature]
AGENT 3,449,679

AUDIO AMPLIFIER CIRCUITS AND THE LIKE

Brian Ernest Attwood, Horley, England, assignor, by mesne assignments, to U.S. Philips Corporation, New York, N.Y., a corporation of Delaware Filed Mar. 15, 1966, Ser. No. 534,307
Claims priority, application Great Britain, Mar. 16, 1965, 11,192/65
Int. Cl. H03f 3/38, 3/68, 3/04
U.S. Cl. 330—10 10 Claims

ABSTRACT OF THE DISCLOSURE

A combined low frequency amplifier and direct current regulator includes a series regulator operating in the switching mode connected between a source of voltage and direct current output terminals. A source of pulses is modulated in at least one time characterictic (e.g. frequency, width or both) by the output voltage in order to control the regulator. A source of low frequency signals (e.g. audio signals) also time modulates the pulses. The low frequency output is connected to the output of the regulator by means of a filter circuit.

This invention has for its object a combined low frequency signal amplifier and stabilized D.C. power supply circuit arrangement including a pair of low frequency input terminals for connection to a low frequency signal source, a pair of D.C. terminals for connection to a D.C. power source, a pair of low frequency output terminals for connection to a low frequency signal-load, and a pair of D.C. output for connection to a D.C. load.

The invention relates particularly, though not exclusively, to the problem of stabilized power supplies in radio and television receivers. Usual stabilization techniques involve the use of a series regulator device which has to be capable of withstanding high dissipations. This is an embarrassment as higher and higher powers are expected, especially in television receivers. For instance, in some recent television designs approximately 60 W. is required by the receiver involving an expected maximum surge power dissipation of up to 22 W. for the series regulator device.

It is one of the objects of the present invention to provide a simple yet efficient combined low frequency signal amplifier and stabilized D.C. power supply circuit arrangement which is transformerless and is capable of utilising a relatively low dissipation regulator device while providing a low frequency amplification with very few additional components.

The combined low-frequency signal amplifier and D.C. power supply circuit arrangement according to the present invention is characterized in that it comprises a series regulator connected for carrying both the D.C. power and the low-frequency signal in the form of pulsed current, control means for controlling said regulator so as to cause it to operate in the switching mode in such manner as to vary the frequency and/or width of the pulses of said current in a manner related to both the amplitude of said low-frequency signal and variations of the output voltage at said pair of D.C. output terminals, first filter means for minimizing pulse-frequency ripple at said pair of D.C. output terminals, and second filter means for directing the amplified low-frequency component from the output of the regulator to said pair of low-frequency output terminals.

In such an arrangement the low frequency control of the regulator and the stabilizing control thereof may employ the same mode of pulse modulation or different modes.

Hereinafter the term "D.C. load" will be used to denote any load which may be connected to the D.C. output terminals.

In addition to stabilization, the stabilizer may, if desired, act as D.C. converter so as to produce a considerable reduction in D.C. supply voltage with little loss of power and without the need for a step-down transformer.

The low-frequency signal may be an audio signal, and the invention is principally concerned with such cases which arise, typically, in radio and television receivers and the like. However, the invention is also applicable to other cases requiring a loop with substantial power gain employing low-frequency signals other than audio (in particular, the low-frequency signal may be a field sawtooth deflection waveform for a cathode-ray tube, in which case the circuit arrangement is a combined field deflection amplifier and stabilized D.C. power supply arrangement).

The invention will now be described in greater detail with reference to a particular method of D.C. stabilization which employs pulse-frequency or combined pulse-frequency or combined pulse-frequency and pulse-width modulation.

The circuit arrangement for carrying out the D.C. stabilization according to this particular method is characterized in that said series regulator is constituted by a semi-conductor device having a control terminal and having a main current path connected between a first one of said D.C. input terminals and a first one of said D.C. output terminals in that it includes an energy recovery diode connected in parallel between the output side of said regulator and the second of said D.C. output terminals in that said first filter means are constituted by a series inductance connected between the output side of the regulator and said first D.C. output terminal and a shunt capacitor connected across said D.C. output terminals, in that said control means include a control circuit connected between the D.C. output terminals for monitoring variations of the D.C. output voltage thereat and deriving a control signal in the form of pulses whose frequency varies in a manner related to the D.C. output voltage, means for applying said control signal to the control terminal of the series regulator so as to cause the latter to operate in the switching mode, means being provided for applying low frequency signals from said low frequency input terminals to said regulator in such manner as to cause additional modulation of said pulses in frequency and/or in width, and in that said second filter means are connected between said regulator and low frequency output terminals for directing to the latter the low frequency component of the regulator output.

Such circuit arrangements will first be described in relation to their D.C. stabilizing function.

With such an arrangement the regulator may be a transistor or it may be a gate-controlled SCR (semi-conductor controlled rectifier) and in each case the switching mode of operation implies that the device is either turned off or it is in the bottomed state so that power dissipation therein is minimized.

The use of frequency modulation permits the adoption of a very simple and efficient control circuit employing a breakdown device as will be explained later.

The arrangement can operate as a converter to achieve a considerable change in the D.C. level. In the notable case of a transistorized television receiver, the arrangement can provide stabilized conversion from a rectified A.C. mains input (e.g. 240 volts) to a D.C. output of, say, 30 volts without the need for a step-down transformer, and with very little power dissipation.

It is necessary that the resultant output should be a D.C. voltage having a value dependent on the mean level of the pulsed control or switching waveform, and this is achieved by the aforesaid first filter means.

In order to achieve a substantially constant D.C. output voltage with a varying D.C. load it is necessary to change the mean level of the switching waveform in such a fashion that it compensates for changes in the input supply voltage and also for changes in output voltage brought about by varying load conditions. Suitable types of stabilizer modulation are plain pulse-frequency modulation (mode (*a*)) and pulse-frequency modulation with an added component of pulse-width modulation (mode (*b*)). The detailed description of the stablizer function deals primarily with mode (*b*) and one particular way in which stabilization may be achieved.

The invention will now be described with reference to the accompanying drawing, wherein.

Figure 1:
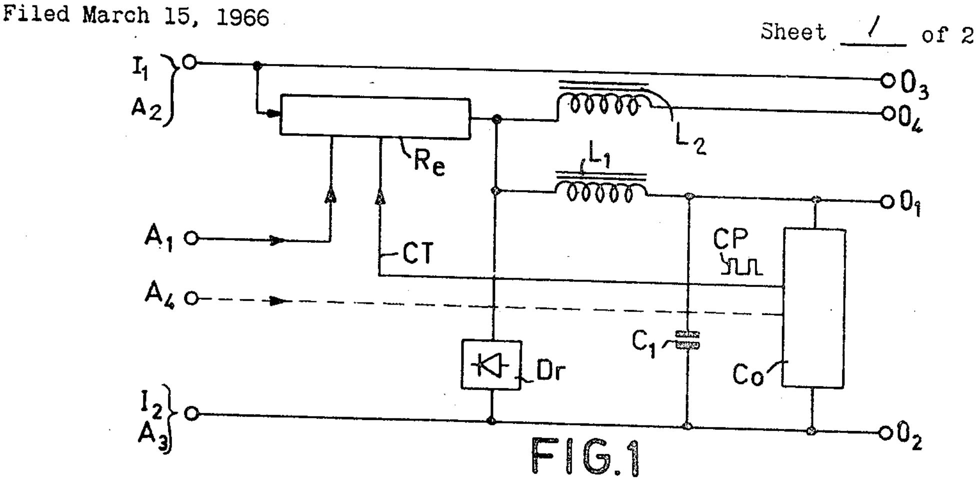
FIG. 1 is a block-diagram of a general embodiment of the circuit arrangement according to the invention.
Figure 5:
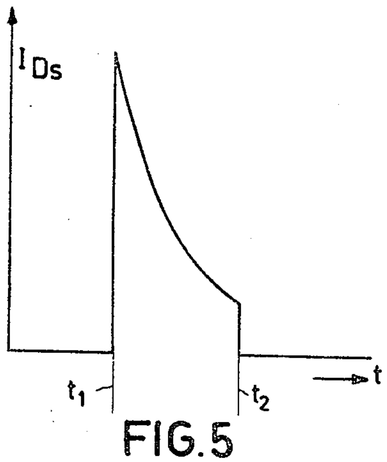
FIGS. 5, 6 and 7 are current-time and voltage-time diagrams used for explaining the mode of operation of the circuit arrangement according to the invention.

Referring to FIGURE 1, the arrangement shown comprises a pair of D.C. input terminals I1–I2 for connection to a D.C. power source, a pair of D.C. output terminals 01–02 for connection to a D.C. load, and a series regulator R*e* constituted by a semi-conductor device having a control terminal CT and having a main current path connected between the first of said D.C. input terminals I1 and the first of said D.C. output terminals O1. An energy recovery diode D*r* is connected in parallel between the output side of the regulator and the second D.C. output terminals. The low-pass filter comprises a series inductance L1 between the output side of the regulator and the first D.C. output terminal and a shunt capacitor C1 connected across the D.C. output terminals. The control circuit C*o* is connected between the D.C. output terminals for monitoring variations of the output voltage thereat and deriving a control signal in the form of pulses, and there is a coupling CP for applying said control signal to the control electrode of the series regulator so as to cause the latter to operate in the switching mode.

Having described the stabilizer function of the arrangement of FIGURE 1, its audio amplfier function will now be described briefly. The diagram illustrates, in a particular way, the fact that the audio input signal may be applied to the regulator R*e* directly or it may be applied indirectly via the control circuit C*o*. Thus two alternative pairs of audio input terminals are shown at A1–A2 and A3–A4 the first pair being connected direct to the regulator R*e* and the second pair (A3–A4 or their A.C. equivalent A2–A4) being connected thereto via an alternative (dotted) indirect coupling which includes the control circuit C*o*. When audio is applied to one of these pairs of input terminals said audio provides additional modulation of pulse width and/or frequency (according to the input terminals used, as will be explained) said modulation being related to the applied audio. The audio output (at very much higher power levels) is fed via a filter L2 to audio output terminals O3–O4 and thence to a suitable audio load, e.g. a loudspeaker.

More detailed embodiments (suitable for transistorized radio or television receivers) will now be described with reference to FIGURES 2 to 7 of the accompanying drawings where the same references are used for corresponding elements. The stabilizer function of these arrangements will be described first.

In these arrangements the series regulator R*e* of FIG. 1 is a transistor T*r* and its control terminal is its base lead.

Figure 2:
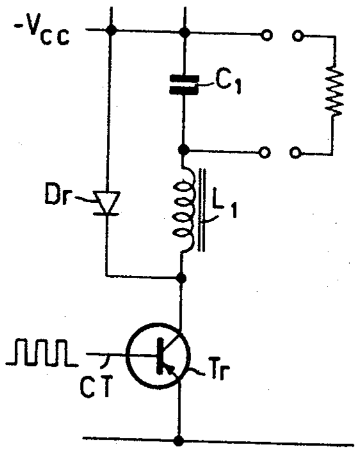
FIG. 2 is a circuit-diagram of a series regulator suitable for the circuit arrangement according to the invention.

The regulator R*e* and filter circuit being the simplest part of the arrangement an example of this circuit is considered first and is given in FIGURE 2.

If a suitable switching waveform is available at its base, transistor T*r* will either be in the off or in the bottomed condition.

Inductance L1 and capacitor C1 are provided, again, to act as the low-pass filter so that a D.C. voltage, whose value is dependent on the mean level of the collector waveform, is available across the load.

Diode D*r* provides, again, an energy recovery path, current flowing back into the load from the stored energy in the inductor L1. With such a circuit very high efficiencies can be obtained, e.g. more than 90%.

This means that high power outputs can be handled with a low-dissipation transistor. A further point is that a wide variety of D.C. voltages across the load are available by changing the base switching waveform so that its mean level is either increased or reduced at the collector of regulator T*r*.

This provides the possibility of obtaining a low H.T. rail for transistor circuits (e.g. 30 v.) direct from a high H.T. line connected to terminals I1-I2 (e.g. 240 v. rectified mains). Such an output circuit can in fact employ a transistor of Mullard Type OC8I for input H.T. rails. (I1–I2) of up to 35 v. and D.C. output powers of 10–16 w. For higher D.C. output powers the Mullard AU102–AU103 types of transistor can be used, giving for example D.C. output powers of 40–50 w. or more at 30 v. from input voltages of 100 v. or more.

In the latter case, however, the AU102–3 transistor is not required from a dissipation point of view but purely for the sake of the peak voltage rating.

From a relatively simple circuit, therefore, it is possible to obtain a wide variety of D.C. output powers and voltages.

Preferably the control circuit C*o* of FIG. 1 employs a breakdown device of the kind having a constant breakdown voltage substantially independent of temperature applied voltage, which device has two well-defined states, i.e. an "OFF" state and a fully conductive "ON" state, such device being connected in parallel with a charging capacitor and in series with a resistance through which the capacitor is charged up to the breakdown voltage. An example of suitable breakdown device is the 4-layer Shockley type diode. As will be seen, such a simple and cheap control circuit can perform simultaneously four functions, i.e.:

(A) acting as oscillator (without the transformer used in the aforesaid prior proposal).

(B) providing a constant reference (without the need for a separate reference device such as the zener diode used in the aforesaid prior proposal).

(C) providing loop gain.

(D) acting as pulse-frequency (or mixed pulse-frequency and pulse-width) modulator.

Figure 3:
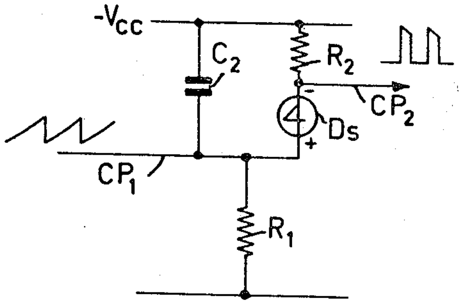
FIG. 3 is a circuit diagram of control means suitable for the circuit arrangement according to the invention.

An example of such a circuit is shown in FIGURE 3. In this circuit a four-layer two-terminal pnpn diode D*e* is used as the control element since such a device has most of the basic requirements for a sensitive control element.

There are the following two ways in which a four-layer diode may be used for controlling the D.C. output voltage, and these will be discussed with reference to FIGURE 3.

Capacitor C2, after switch-on, will charge exponentially (in the negative direction) towards voltage V*cc* in a time dependent on the values of R1, C2. When the voltage across C2 reaches the breakdown voltage of D*s* (at instant *t*1, FIGURE 5) D*s* conducts and discharges C2 exponentially in a time dependent on the values of C2 and R2. When the discharge current of C2 falls below the holding current of D*s* (instant *t*2 of FIGURE 5) the device switches off and the cycle recommences. Thus D*s* performs the function of an oscillator in providing a sawtooth voltage across C2 (output line CP1) or a pulsed voltage across R2 (output line CP2). In addition, since the breakdown voltage B*bo* of the device D*s* is fixed, capacitor C2 will always charge to the same level irrespective of the applied voltage V*cc*. Thus the pulse voltage across R2 will be of constant width, assuming the current via R1 to be low compared to the holding current of D*s*. In addition, the sawtooth voltage across C2 will be constant in amplitude (this, then, effectively provides the desired reference). If the input voltage —V*cc* varies, then the resultant pulse output at CP2 will vary correspondingly in its mark-space ratio so that there will be a fixed "mark" but variable "space." Thus plain frequency modulation (mode (*a*)) has been obtained.

Finally, the desired loop gain necessary for compensation can be obtained by choosing a diode D*s* having a breakdown (V*bo*) voltage which is only slightly lower than the aiming potential of capacitor C2. If this is so, then small changes in aiming potential (for example Δ *ht*, FIGURE 7) produce large changes in pulse timing (Δ *t*, FIGURE 7) and hence in pulse frequency.

The output of the circuit of FIGURE 3 can be applied via any necessary amplifier or buffer stages to the output circuit shown in FIGURE 2 (if the pulsed output from R2 is chosen it may in some cases be fed directly to the base of T*r*).

The other mode of operation will now be considered (again with reference to FIGURE 3) namely mode (*b*).

Figure 6:
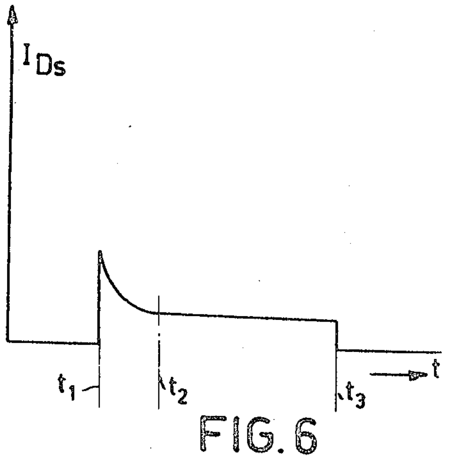
Figure 7:
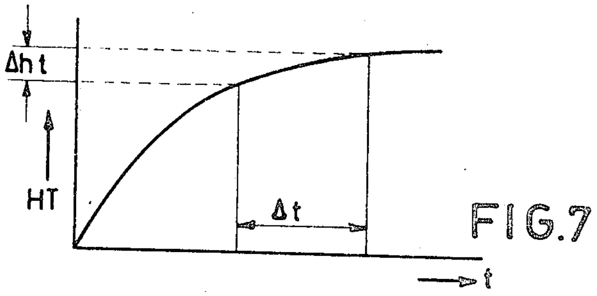

R1 and R2 are chosen to have such values that the current flowing via R1–R2 (when diode D*s* is conducting) approaches the holding current value of the device D*s*. In addition R2 is such that the voltage developed across it (during conduction of D*s*) prevents rapid decay of the charge of C2, and this is particularly apparent for the period *t*2–*t*3 (FIGURE 6). Any resultant change in the voltage across R1–R2 will alter (during conduction of D*s*) the component of steady-state voltage across R2 (i.e. the voltage which would appear in the absence of D*s* and C2). The slowness of the discharge through R2 will cause very marked changes in pulse width. Pulse frequency also changes as previously described and the result is therefore a combination of both pulse-width and pulse-frequency modulation.

A further point is that when variations in V*cc* (FIGURE 3) are considered, they should of course not only be dependent on input voltage variations (e.g., mains variations) but also on load variations. Thus, in order to ensure that stabilisation occurs due to either effect, it is essential that the control circuit be connected between the output terminals.

Figure 4:
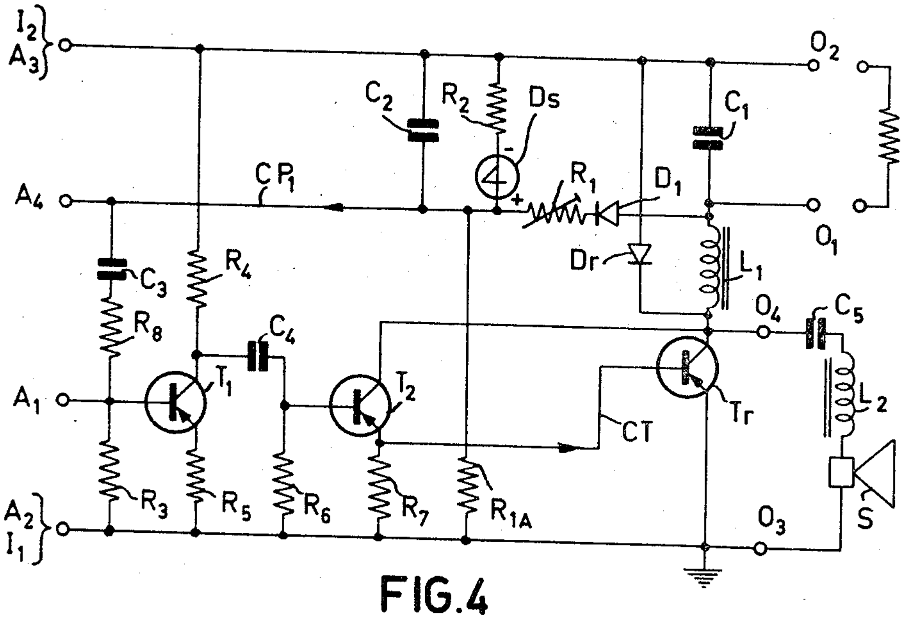
FIG. 4 is a circuit diagram of an embodiment of the circuit arrangement according to the invention.

A complete and more refined supply circuit arrangement is shown in FIGURE 4. Although this arrangement includes also low frequency signal-circuitry, the arrangement will first be described in relation to its D.C. stabilizer function.

It will be noted that, in addition to the circuitry of FIGURE 3, the control circuit includes a clipper-amplifier T1 used to provide fast edges to the pulses and an emitter-follower T2 used to ensure that sufficient drive is available to the regulator transistor (T1 is necessary in this case because the sawtooth output CP1 of the control circuit is used).

The control circuit is connected across the D.C. output terminals O1–O2 via a diode D1. This is done since at switch-on no voltage will be present across the output terminals. Thus, the oscillator action of D*s* would not start. If, however, an additional path R1A is provided to the positive rail, then oscillation will immediately start and provide a switching waveform at the base of T*r* via C3, T1 and T2. A voltage will then be provided across the D.C. load, D1 will conduct and the main charging path for C2 will be via D1, R1, so as to provide charging current therefor.

The operation of the D.C. stabilizer function of the arrangement of FIGURE 4 having been considered the operation of its low frequency signal amplifier circuitry will now be described in relation to two specific circuit configurations given by way of example.

In the first, the low-power low frequency signal is applied to terminals A1–A2 and the operating point of the clipper amplifier T1 is altered in a manner dependent on the low frequency input signal (Application of the low frequency input signal to the emitter of T1 is also possible).

Since the input to T1 is substantially a sawtooth from CP1 (FIGURE 3) the resultant output pulses from T1 will be such that supply and D.C. load changes cause plain frequency changes (mode (*a*)) or combined frequency and pulse-width changes (mode (*b*)) but the applied low frequency signal varies substantially only the pulse width (mode (*c*)). By applying the low frequency signal to T1 it is ensured that the low frequency signal has little or no effect on the operation of D*s*. The low frequency signal component (at much higher output power levels) may be recovered via an additional filter connected to the collector of T*r*, e.g. inductance L2 (FIGURE 4) (the capacitor C5 of FIGURE 4 acts effectively only to block D.C.).

The low frequency input signal may alternatively be applied directly to the control circuit, e.g. across terminals A3–A4 (if it is applied at A3–A4 the external low frequency signal source preferably has an internal impedance much greater than R1). In any event, the low frequency signal may be applied in such manner that the frequency (mode (*a*)) or the frequency and pulse width (mode (*b*)) is additionally dependent on the applied low-power low-frequency signal. In this case (i.e. low frequency signal applied to the control circuit direct) the low frequency signal component will modulate the pulses in the same mode ((*a*) or (*b*)) as the supply voltage or D.C. load variations and the regulator T*r* may be driven by the pulses CP2 (FIG. 3), e.g. by connecting capacitor C3 to the common point of R2 and D*s* instead of to low frequency signal input terminal 4A.

It is necessary that the operating frequency of the stabiliser be sufficiently high to prevent undesirable beat effects on the low frequency signal. In practice, a minimum stabiliser frequency greater than 15 kc./s. is found to give acceptable results.

Whichever of the above configurations is adopted (terminals A1–A3 or A3–A4), the operation described is feasible without substantially affecting the D.C. output voltage of the stabiliser (at terminals 01–02). There are two reasons for this: (a) the small percentage modulation required for a satisfactory low frequency signal output (this is mainly due to the fact that the D.C. load power normally involved is high as compared to the low frequency signal output power) and (b) the long time constant of the D.C. load and its filter network (L1–C1) compared to the frequency of the applied low frequency signal.

An arrangement in accordance with FIGURE 4 has given measured performance as follows:

*Table I*

| | |
|---|---|
| Nominal D.C. input voltage (at I1–I2) | 90 v. |
| Nominal output voltage (at O1–O2) | 30 v. |
| Nominal output current | 1.5 a. |
| Mean power to output stage *Tr* | 49 w. (without audio). |
| D.C. output power in D.C. load | 45 w. |
| Audio output in audio load | 2 w., approximately. |
| Efficiency (between I1–I2 and O1/O2) | 85–90%. |
| Input voltage variations of ±20% | Output voltage variations of ±0.15–0.2 v. |
| Load variation from 30 w. to 65 wt. | Output variation of 0.04 v. |

On practical set of values and components suitable for such an arrangement is given below by way of illustration:

*Table II*

| | |
|---|---|
| Transistor T*r* | Mullard type AU103. |
| Transistor T1 | Mullard type ACY17. |
| Transistor T2 | Mullard type ACY17. |
| 4-layer device D*s* | Brush Clevite 4AD20/20. |
| Diode D*r* | Mullard type OA31. |
| Diode D1 | Mullard type OA10. |
| Inductor L1 | 5 mh. |
| Inductor L2 | 1 mh. |
| Capacitor C1 | 1000 μf. |
| Capacitor C2 | 0.022 μf. |
| Capacitor C3 | 0.1 μf. |
| Capacitor C4 | 2.2 μf. |
| Capacitor C5 | 200 μf. |
| Resistor R1 | 1KΩ. |
| Resistor R1A | 5.6KΩ |
| Resistor R2 | 470 oms. |
| Resistor R3 | 8.2KΩ. |
| Resistor R4 | 1.2KΩ. |
| Resistor R5 | 47 ohms. |
| Resistor R6 | 1KΩ. |
| Resistor R7 | 47 ohms. |
| Resistor R8 | 1KΩ. |

The data of the above Tables I and II relates specifically to mode (*b*) i.e. combined pulse-width and pulse-frequency modulation for the D.C. stabilizer function. To obtain frequency modulation alone (mode (*a*)) for stabilising, similar values and components can be used except for R1 and R2 which must changed so that R1 is large with respect to R2. For example R1 may have a value of 25K oms. and R2 a value of 100 ohms.

It was stated in the preamble that the low-frequency input signal could be a field saw-tooth deflection waveform instead of an audio signal. In that case a saw-tooth voltage with field frequency may be applied between terminals A1 and A2 or between terminals A3 and A4. Then the arrangement may employ for diode D*s* a breakdown device (e.g. a four-layer diode) in the control circuit and a transistor T*r* or a SCR in the regulator circuit.

Moreover speaker S should be replaced by a field deflection coil, arranged around the neck of a television picture tube. Such a field deflection circuit is described in U.S. Patent No. 3,343,006. In this application the control circuit shown in FIG. 3 of the present application is described more in detail.

It must be taken into consideration that when the sawtooth voltage is applied between terminals A3 and A4 it should be applied via a resistor of large value with respect to R2 if mode (*a*) is preferred, whereas it must be of the same order as R2 if mode (*b*) is chosen.

In the case of a saw-tooth voltage with field frequency is applied, the complete circuit arrangement operates in a manner similar to the arrangement described hereabove with reference to FIG. 4.

What we claim is:

1. A combined low-frequency signal amplifier and direct current regulator circuit comprising a source of voltage to be regulated, a source of low-frequency signals, a series regulator circuit having an input circuit connected to said source of voltage, direct current output voltage terminal means, a source of pulsatory signals responsive to voltages applied thereto for varying a time characteristic of said pulsatory signal, means for connecting said output voltage terminals and said source of low-frequency signals to said source of pulsatory signals for modulating at least one time characteristic of said pulsatory signal as a function of the amplitudes of said low-frequency signal and the voltage at said output voltage terminals, means applying said modulated pulsatory signals to said regulator circuit, whereby said regulator circuit operates in a switching mode, low-frequency output terminal means, first filter means connected between the output of said regulator circuit and said output voltage terminals for minimizing pulse frequency and low-frequency ripple at said output voltage terminals, and second filter means connected between the output of said regulator circuit and said low-frequency terminal means for minimizing pulse frequency ripple at said low-frequency output terminal means.

2. The circuit of claim 1, wherein the said source of low-frequency signals is a field sawtooth deflection signal generator for a cathode-ray tube.

3. A combined low frequency signal amplifier and voltage stabilizer circuit comprising a pair of low frequency input terminals for connection to a low frequency signal source, a pair of D.C. input terminals for connection to a D.C. power source, a pair of low frequency output terminals for connection to a low frequency load, a pair of D.C. output terminals for connection to a D.C. load, an inductor, a series regulator comprising a semiconductor device having a control terminal and having a main current path, means connecting said main path and inductor in series in that order between one of said D.C. input terminals and one of said D.C. output terminals, a shunt capacitor connected across the D.C. output terminals, said inductor and shunt capacitor comprising a first filter, a control circuit connected between the D.C. output terminals for monitoring variations of the D.C. output voltage thereat and deriving a control signal in the form of pulses having at least one time characteristic that varies in response to variations in the D.C. output voltage, means for applying said control signal to the control terminal of the series regulator so as to cause the latter to operate in the switching mode, means for applying low frequency signals from said low frequency input terminals to said control circuit for additionally modulating a time characteristic of said pulses, and a second filter connected between one of said low frequency output terminals and the junction of said inductor and main path whereby the low frequency component of the regulator output is applied to said low frequency output terminals.

4. A circuit as claimed in claim 3, wherein the control circuit comprises a pulse generating circuit comprising a breakdown device of the kind having a constant breakdown voltage which is substantially independent of temperature and applied voltage and has two well-defined conducting states, a charging capacitor connected in parallel with said breakdown device, a resistance connected in series with said parallel circuit, whereby the charging capacitor is charged up to the breakdown voltage, and means connecting said pulse generating circuit between said D.C. output terminals.

5. A circuit as claimed in claim 3, wherein the regulator is a transistor, and said main path is the emitter collector path of said transistor, and said control terminal is the base of said transistor.

6. A circuit as claimed in claim 3, wherein the regulator is a gate-controlled SCR.

7. A circuit as claimed in claim 4, wherein the breakdown device is a four-layer semi-conductor diode.

8. The circuit of claim 4, in which said control circuit further comprises clipper amplifier means for applying the voltage across said charging capacitor to said regulator, and means for applying low frequency signals from said low frequency input terminals to the input of said clipper amplifier means.

9. The circuit of claim 4, comprising means for applying low frequency signals from said low frequency input terminals to said charging capacitor.

10. The circuit of claim 4, wherein one electrode of said charging capacitor is connected to said other D.C. input terminal, comprising resistor means for connecting the other electrode of said charging capacitor to said one D.C. input terminal and diode means for connecting said other electrode of said charging capacitor to said one D.C. output terminal, whereby said pulse generating circuit oscillates in the absence of a D.C. output voltage.

References Cited

UNITED STATES PATENTS

| | | | |
|---|---|---|---|
| 3,305,767 | 2/1967 | Beihl | 307—297 X |
| 3,365,672 | 1/1968 | Kaplan | 330—20 X |

NATHAN KAUFMAN, *Primary Examiner.*

U.S. Cl. X.R.

330—24, 20, 40

PO-1050
(5/69)

UNITED STATES PATENT OFFICE
CERTIFICATE OF CORRECTION

Patent No. 3,449,679 Dated June 10, 1969

Inventor(s) BRIAN ERNEST ATTWOOD

It is certified that error appears in the above-identified patent and that said Letters Patent are hereby corrected as shown below:

column 1, line 18, "characterictic" should read -- characteristic --;

column 5, line 27, "Bbo" should read -- Vbo --;

column 7, line 27, "On" should read -- One --;

Signed and sealed this 11th day August 1970.

(SEAL)
Attest:

Edward M. Fletcher, Jr.
Attesting Officer

WILLIAM E. SCHUYLER, JR.
Commissioner of Patents